US010187473B2

United States Patent
Webb et al.

(10) Patent No.: US 10,187,473 B2
(45) Date of Patent: Jan. 22, 2019

(54) GATEWAY POLICY ENFORCEMENT AND SERVICE METADATA BINDING

(71) Applicants: Jason Michael Webb, San Marcos, CA (US); Amit Ramchandra Jere, San Diego, CA (US); Thomas Barnes, San Diego, CA (US); Miroslav Svetoslavov Boussarov, San Diego, CA (US); Viraj Raghunath Kulkarni, San Diego, CA (US); Shailesh Shamarao Sawant, San Marcos, CA (US); Santosh Shenoy, San Diego, CA (US); Michael Scott Obendorf, San Diego, CA (US)

(72) Inventors: Jason Michael Webb, San Marcos, CA (US); Amit Ramchandra Jere, San Diego, CA (US); Thomas Barnes, San Diego, CA (US); Miroslav Svetoslavov Boussarov, San Diego, CA (US); Viraj Raghunath Kulkarni, San Diego, CA (US); Shailesh Shamarao Sawant, San Marcos, CA (US); Santosh Shenoy, San Diego, CA (US); Michael Scott Obendorf, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 153 days.

(21) Appl. No.: 15/143,492

(22) Filed: Apr. 29, 2016

(65) Prior Publication Data

US 2017/0318095 A1    Nov. 2, 2017

(51) Int. Cl.
*H04L 29/08*    (2006.01)
*H04L 12/24*    (2006.01)
*H04L 12/26*    (2006.01)
*H04L 29/06*    (2006.01)
*G06F 17/27*    (2006.01)
(Continued)

(52) U.S. Cl.
CPC .......... *H04L 67/14* (2013.01); *H04L 41/0803* (2013.01); *H04L 43/08* (2013.01); *H04L 67/28* (2013.01); *H04L 67/2804* (2013.01); *H04L 67/42* (2013.01)

(58) Field of Classification Search
USPC ........................................ 709/204, 227, 217
See application file for complete search history.

(56) References Cited

U.S. PATENT DOCUMENTS 6,442,620 B1 *  8/2002  Thatte ..................... G06F 9/465
                                                                    719/316
6,480,995 B1 * 11/2002  Schmidt .............. G06F 17/5068
                                                                    716/112
(Continued)

OTHER PUBLICATIONS

International Search Report and Written Opinion for PCT/US2017/026485, dated Jul. 17, 2017, 11 pages.

*Primary Examiner* — Jude Jean Gilles
(74) *Attorney, Agent, or Firm* — Ferguson Braswell Fraser Kubasta PC

(57) ABSTRACT

The invention relates to a method for gateway policy enforcement. The method includes receiving configuration data from a services registry. Also, the method includes annotating, based on the configuration data, a plurality of policies with flags. In addition, the method includes binding, using the annotations of the policies, a route to at least one of the annotated policies.

20 Claims, 6 Drawing Sheets

(51) Int. Cl.
*G06F 15/173* (2006.01)
*G06F 15/16* (2006.01)

(56) References Cited

U.S. PATENT DOCUMENTS

| | | | |
|---|---|---|---|
| 7,225,249 B1* | 5/2007 | Barry | G06F 17/3089 709/227 |
| 7,272,712 B1* | 9/2007 | Gryck | G06F 8/71 713/1 |
| 7,490,073 B1* | 2/2009 | Qureshi | G06N 5/048 706/50 |
| 9,690,771 B2* | 6/2017 | Tremblay | G06F 17/271 |
| 10,025,810 B2* | 7/2018 | Burk | H04L 41/0893 |
| 2002/0174191 A1* | 11/2002 | Robertson | G06Q 10/063112 709/217 |
| 2004/0015972 A1* | 1/2004 | Barclay | G06F 9/45516 718/102 |
| 2008/0016568 A1* | 1/2008 | Szor | G06F 21/564 726/22 |
| 2010/0175104 A1* | 7/2010 | Khalid | G06F 9/545 726/1 |
| 2010/0180344 A1* | 7/2010 | Malyshev | G06F 21/566 726/23 |
| 2012/0023217 A1 | 1/2012 | Wakumoto | |
| 2012/0110680 A1 | 5/2012 | Oliver et al. | |
| 2013/0097653 A1* | 4/2013 | Naor | G06F 3/0613 726/1 |
| 2013/0242997 A1 | 9/2013 | Bansod et al. | |
| 2014/0229593 A1 | 8/2014 | Burke et al. | |
| 2014/0245262 A1* | 8/2014 | Hill | G06F 8/70 717/120 |
| 2015/0128213 A1 | 5/2015 | Steed et al. | |
| 2015/0149148 A1* | 5/2015 | Ramakrishnan | G06F 17/289 704/2 |

\* cited by examiner

US 10,187,473 B2

GATEWAY POLICY ENFORCEMENT AND SERVICE METADATA BINDING

CROSS-REFERENCE TO RELATED APPLICATIONS

This application is related to U.S. patent application Ser. No. 15/143,489, filed Apr. 29, 2016, entitled "MONITORING OF APPLICATION PROGRAM INTERFACE INTEGRATIONS"; and U.S. patent application Ser. No. 15/143,497, filed Apr. 29, 2016, entitled "CONFIGURATION DATA AS CODE".

BACKGROUND

A services gateway may be configured to enforce many different policies. The policies may include different authentication types, authorization rules, throttling rules, and/or and traffic swimlanes. The policies enforced for a given request received at the services gateway may be controlled by a service configuration stored within a services registry. In other words, the services gateway enforces policies based on data of the services registry. The lookup of this data, as a policy enforcement mechanism, may be slow and subject to increasing delay as the number of policies enforced on the services gateway increases.

SUMMARY

In general, in one aspect, the invention relates to a method for gateway policy enforcement. The method includes receiving configuration data from a services registry. Also, the method includes annotating, based on the configuration data, a plurality of policies with flags. In addition, the method includes binding, using the annotations of the policies, a route to at least one of the annotated policies.

In general, in one aspect, the invention relates to a system for gateway policy enforcement. The system includes a hardware processor and memory. Also, the system includes software instructions stored in the memory. The software instructions are configured to execute on the hardware processor, and, when executed by the hardware processor, cause the hardware processor to receive configuration data from a services registry. Also, when executed by the hardware processor, the software instructions cause the hardware processor to annotate, based on the configuration data, a plurality of policies with flags. Still yet, when executed by the hardware processor, the software instructions cause the hardware processor to bind, using the annotations of the policies, a route to at least one of the annotated policies.

In general, in one aspect, the invention relates to a non-transitory computer readable medium for gateway policy enforcement. The non-transitory computer readable medium stores instructions which, when executed by a computer processor, include functionality for receiving configuration data from a services registry. Also, the non-transitory computer readable medium stores instructions which, when executed by the computer processor, include functionality for annotating, based on the configuration data, a plurality of policies with flags. Still yet, the non-transitory computer readable medium stores instructions which, when executed by the computer processor, include functionality for binding, using the annotations of the policies, a route to at least one of the annotated policies.

Other aspects of the invention will be apparent from the following description and the appended claims.

DETAILED DESCRIPTION

Figure 1A:
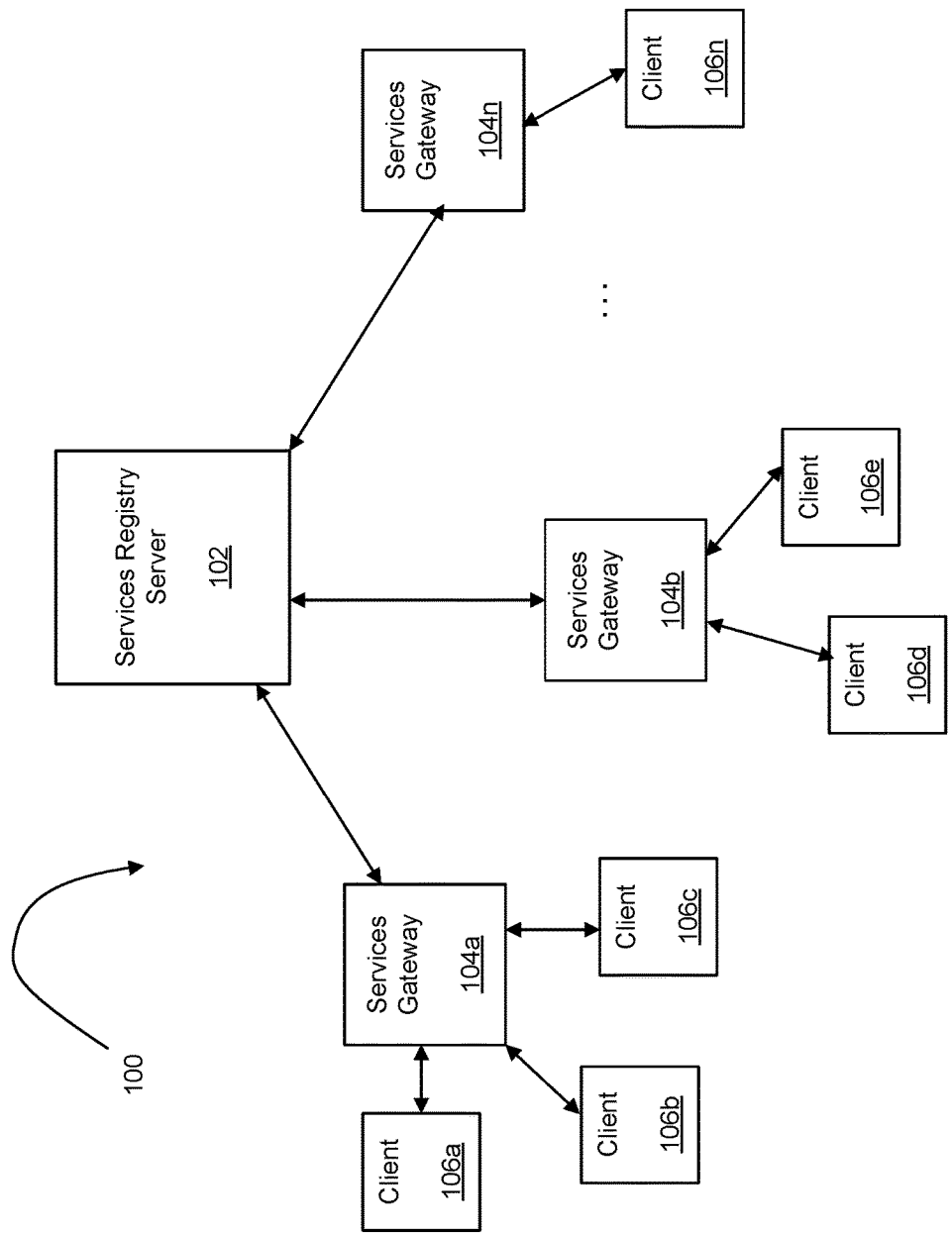
FIGS. 1A and 1B show schematic diagrams of a system for service gateway policy enforcement and service metadata binding, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a system, and a computer readable medium for gateway policy enforcement and service metadata binding. The following description provides services gateways with a mechanism to quickly and efficiently respond to client requests. Moreover, as the number of services accessed via a services gateway increases and/or the number of policies enforced at the services gateway increases, the response time of the services gateways described herein will remain constant, and not coordinately increase.

FIG. 1A shows a schematic diagram of a system (100) for service gateway policy enforcement and service metadata binding, in accordance with one or more embodiments of the invention. The system (100) includes a services registry server (102) in communication with one or more services gateways (104), where the services gateways (104) are in communication with one or more clients (106). More specifically, FIG. 1A shows the services registry server (102) in communication with a first services gateway (104a), a second services gateway (104b), and a third services gateway (104n). Moreover, FIG. 1A shows the first services gateway (104a) in communication with a first client (106a), a second client (106b), and a third client (106c); the second services gateway (104*b*) in communication with a fourth client (106*d*) and a fifth client (106*e*); and the third services gateway (104*n*) in communication with a sixth client (106*n*).

As described herein, communications between the services registry server (102) and the services gateways (104), and between the services gateways (104) and the clients (106), may occur via one or more computer networks to which the registry server (102), the services gateways (104), and the clients (106) are coupled. For example, the computer network(s) may include wired and/or wireless portions of public and/or private data networks, such as wide area networks (WANs), local area networks (LANs), the Internet, etc.

For purposes of simplicity and clarity, the system (100) is shown in FIG. 1A to include a single instance of the services registry server (102), three services gateways (104), and six clients (106) in accordance with one or more embodiments of the invention. However it is contemplated that the system (100) may include multiple services registry servers (102) in accordance with one or more embodiments of the claims. As an option, in systems including multiple services registry servers (102), there may be a single logical services registry that is distributed such that the logical services registry is stored on multiple physical services registry servers (102) in accordance with one or more embodiments of the invention. Moreover, it is contemplated that the system (100) may include any number greater than or less than three services gateways (104), and/or any number greater than or less than six clients (106) in accordance with one or more embodiments of the invention.

As described herein, each of the clients (106*a*-106*n*) includes software and/or hardware that sends requests to one or more of the services gateways (104*a*-104*n*) in accordance with one or more embodiments of the invention. For example, each of the clients (106*a*-106*n*) may include a desktop computer, portable computer (e.g., laptop, netbook, etc.), or mobile device (e.g., tablet computer, cellular phone, smartphone, etc.), etc. Moreover, each of the clients (106*a*-106*n*) may include executing thereon one or more applications. As an option, an application may include a financial management application, such as accounting software or tax software. Moreover, a request from one of the clients (106) may include a message requesting access to one or more resources offered via the service gateways (104). For example, the request may include a GET request for retrieving data from a service, a PUT request for storing data to a service, etc. As an option, an application executing at one or more of the clients (106) may be operating in response to user inputs received, for example, via a user interface at the client (106). Still yet, a request from one of the clients (106) may be sent in response to user input received at the respective client (106). For example, a first services gateway (104*a*) may receive a request from accounting software executing on a first client (106*a*), and a second services gateway (106*b*) may receive a request from tax software executing on a second client (106*d*).

As described herein, each of the services gateways (104*a*-104*n*) includes software and/or hardware for receiving requests from a client (106), and responding to the requests in accordance with configuration data received from the services registry server (102). As noted above, a request from a client (106) may include a message requesting action or access with respect to one or more resources offered via the service gateways (104). In other words, the clients (106) may access remotely hosted resources (e.g., services, applications, data, etc.) via the services gateways (104). Moreover, the services gateways (104) may control access to the remotely hosted resources based on configuration data received from the services registry (102). Thus, the services gateways (104) may permit or reject access, by the clients (106), to remotely hosted resources based on configuration data that originates from the services registry server (102), as described in more detail below.

As described herein, the services registry server (102) includes software and/or hardware that stores a services registry in accordance with one or more embodiments of the invention. The services registry includes a repository storing configuration data for use by each of the services gateways (104*a*-104*n*). In one or more embodiments, the configuration data of the services registry may include metadata, such as security metadata. In one or more embodiments, the services registry server (102) provides the configuration data stored within its services registry to the services gateways (104), as described in more detail below.

Figure 1B:
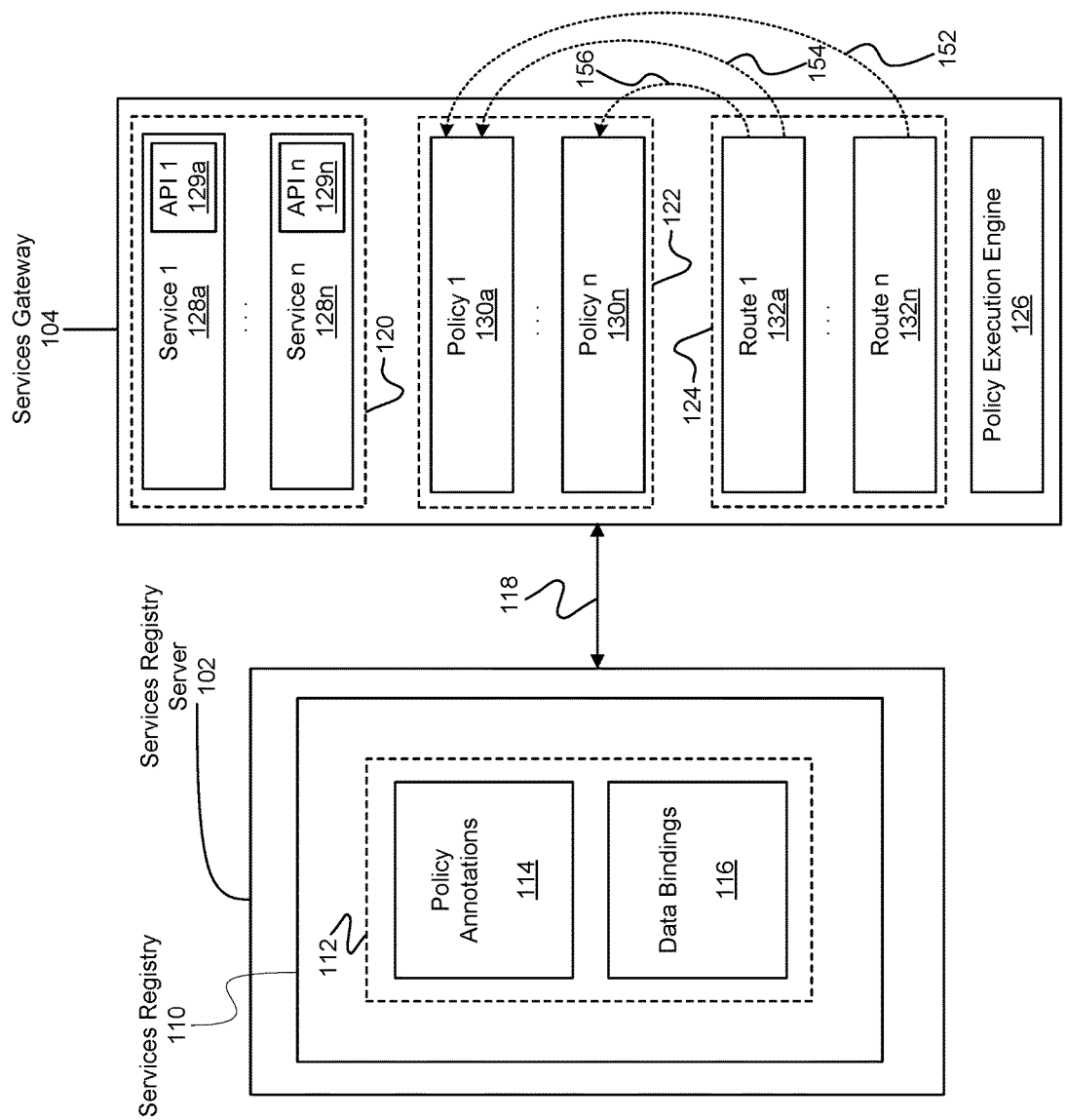

Referring now to FIG. 1B, another schematic diagram is shown of the system (100) for service gateway policy enforcement and service metadata binding, in accordance with one or more embodiments of the invention. Specifically, FIG. 1B illustrates in more detail a services registry server (102), a services gateway (104), and a computer network (118) therebetween.

As shown in FIG. 1B, the services gateway (104) is illustrated to include a services pool (120), a policies pool (122), a routes pool (124), and a policy execution engine (126) in accordance with one or more embodiments of the invention.

The services pool (120) of the services gateway (104) of FIG. 1B is shown to include various discrete services (128*a*-128*n*) in accordance with one or more embodiments of the invention. As used herein, a service includes any resource accessible for use over a network. As an option, one or more of the services (128) may be utilized by an application developed by a first party, second party, or third party application developer. In one or more embodiments, the services (128) of the services pool (120) may include any combination of platforms, software applications, and/or processes. For example, service 1 (128*a*) may include an identity service, and service n (128*n*) may include a document service. Additional examples of services (128) that may be included in the services pool (120) include: routing services, commerce services, data access services or platforms, financial management applications (e.g., accounting platforms, tax management platforms, etc.), and/or data exchange services. For purposes of simplicity, the services pool (120) is shown to include two services (128), however it is contemplated that the services pool (120) may include any number of different services (128). For example, the services pool (120) may include tens, hundreds, or thousands of services (128).

In one or more embodiments, a service (128) of the services pool (120) may include an application program interface (API (129)). For example, service 1 (128*a*) is shown to include API 1 (129*a*) and service n (128*n*) is shown to include API n (129*n*). An API (129) may include a set of remote calls for accessing data of the respective service (128). For example, if service 1 (128*a*) is an identity service, then API 1 (129*a*) of service 1 (128*a*) may include one or more methods for calling the identity service to validate a device or user utilizing the identity service. Similarly, if service n (128*n*) is a document service, then API n (129*n*) of service n (128*n*) may include one or more methods for calling the document service to store, delete, or modify a file, folder, or object.

In one or more embodiments, the services (128) in the services pool (120) may call each other. For example, service 1 (128a) of the services pool (120) may call service n (128n) using API n (129n).

Further, the policies pool (122) of the services gateway (104) of FIG. 1B is illustrated to include a plurality of policies (130a-130n). A policy includes any information that defines how to, and/or is used to, determine whether to grant or deny a client access to a resource. For example, when a client has requested access to the one of the services (128) in a request received at the services gateway (104), one or more of the policies (130) may be utilized for determining whether to grant or deny the client access to the one of the services (128). Each of the policies may include, for example, an authentication type, an authorization rule, a throttling rule, a traffic swimlane, etc.

Also, the routes pool (124) of the services gateway (104) of FIG. 1B is illustrated to include a plurality of routes (132a-132n). As used herein, a route is a path through the services gateway (104). In one or more embodiments, each route includes a Uniform Resource Identifier (URI) pattern. The URI pattern of a given route may define a request path for the route. In one or more embodiments, each route may include a URI pattern and one or more attributes associated with the URI pattern. An attribute associated with a URI pattern may include information that describes a quality, feature, characteristic, and/or property of the URI pattern.

In one or more embodiments, each of the routes (132a-132n) may be bound to one or more of the policies (130a-130n) that are required for the route. For example, as illustrated in FIG. 1B, a first binding (156) binds route 1 (132a) to policy 1 (130a) and a second binding (154) binds route 1 (132a) to policy n (130n); while a third binding (152) binds route n (132n) to policy 1 (130a). Accordingly, policy 1 (130a) and policy n (130n) may be required for route 1 (132a), while only policy 1 (130a) is required for route n (132n).

In one or more embodiments, each of the bindings (152, 154, 156) includes an annotation of the respective policy (130) with a set of metadata that defines when it can be executed. For example, the first binding (156) may include an annotation of policy n (130n) with metadata defining that policy n (130n) is executed for requests targeting route 1 (132a). Similarly, the second binding (154) may include an annotation of policy 1 (130a) with metadata defining that policy 1 (130a) is executed for requests targeting route 1 (132a); and the third binding (152) may include an annotation of policy 1 (130a) with metadata defining that policy 1 (130a) is also executed for requests targeting route n (132n).

In one or more embodiments, each of the of the bindings (152, 154, 156) may statically link a route (132) to a policy (130). For example, by way of the first binding (156), route 1 (132a) is statically linked to policy n (130n), and by way of the second binding (154), route 1 (132a) is also statically linked to policy 1 (130a). By way of these bindings, although there may be dozens, hundreds, or more policies on the services gateway (104), only the policies linked to a given route are executed when the route is targeted by a request.

In one or more embodiments, the policy execution engine (126) includes a process executing on the services gateway (104) that executes policies against requests received from clients. For example, upon receiving a request from a client, the policy execution engine (126) may identify policies (130) that need to be executed against the request before the request may be fulfilled. In one or more embodiments, the policies (130) executed against a request may be identified using bindings. For example, the policies (130) executed against a request may be identified by traversing any static links between a route (132) targeted by the request and the policies (130).

In one or more embodiments, the policies (130) executed against a request may be identified based on a content of the request. For example, a particular request may specify a path to a requested resource. The policy execution engine (126) may execute one or more policies (130) against the request in order to determine whether the request can be fulfilled. The policies (130) executed against the request may be identified based on a route identified to match the path in the request. More specifically, the particular policies executed against the request may be identified and executed against the request because the policies are bound to the route that matches the path in the request.

As illustrated in FIG. 1B, the services registry server (102) includes a services registry (110) in accordance with one or more embodiments of the invention. Further, the services registry (110) stores configuration data (112). The configuration data (112) of the services registry (110) includes policy annotations (114) and data bindings (116). The policy annotations (114) include metadata describing various policies. Thus, the policy annotations (114) may include metadata describing one or more authentication protocols. Also, the policy annotations (114) may describe one or more throttling processes. Still yet, the policy annotations (114) may describe one or more authorization protocols. For example, the policy annotations (114) may describe OAuth1, OAuth2, etc., authentication protocols. In other words, the policy annotations (114) describe the different mechanisms that may be available to a services gateway (104) for enforcement against a request from a client, or for otherwise enhancing a request from a client.

Accordingly, the policies (130) within the policies pool (122) may be annotated based on the configuration data (112) of the services registry (110). More specifically, using the policy annotations (114), the services gateway (104) may flag one or more of the policies (130). For example, using the policy annotations (114), the services gateway (104) may identify a first portion of code (e.g., java code, etc.) represented as policy 1 (130a), and flag the first portion of code as the "OAuth1" policy. In the same example, using the policy annotations (114), the services gateway (104) may identify a second portion of code represented as policy n (130n), and flag the second portion of code as the "OAuth1" policy. In this manner, using the policy annotations (114), code resident on the services gateway (104) may be discretized into the individual policies (130).

Additionally, the data bindings (116) stored in the services registry (110) include metadata that identifies bindings between policies (130) and routes (132). More specifically, the data bindings (116) specify target routes (132) to which one or more policies (130), as described in the policy annotations (114), should be bound. Thus, where the policy annotations (114) flag a first portion of code as including the "OAuth1" policy, the data bindings (116) may specify one or more routes to which the "OAuth1" policy is bound. Similarly, where the policy annotations (114) flag a second portion of code as including the "OAuth2" policy, the data bindings (116) may specify one or more routes to which the "OAuth2" policy is bound.

Accordingly, using the policy annotations (114) and the data bindings (116) of the services registry (110), the policies (130) may be annotated and bound to routes (132). In other words, as illustrated in FIG. 2B, the bindings (152, 154, 156) are created within the services gateway (104) based on the configuration data (112) of the services registry (110).

In one or more embodiments, the policy annotations (114) and the data bindings (116) are received from the services registry server (102) by the services gateway (104) over the computer network (118). In one or more embodiments, after receiving the policy annotations (114), the services gateway (104) may annotate different portions of code to identify the policies (130) of the policies pool (122). Moreover, after receiving the data bindings (116), the services gateway (104) may bind one or more of the policies (130) to one or more of the routes (132).

In one or more embodiments, the annotation of the policies (130) and/or the creation of the bindings (152, 154, 156) may occur when the services gateway (104) is initialized. As an option, when the services gateway (104) is initialized, the services gateway (104) retrieves the policy annotations (114) and the data bindings (116) from the services registry (110). The initialization of the services gateway (104) may include, for example a startup process. In other words, as the services gateway (104) is started, the services gateway (104) retrieves (e.g., via the computer network 118, etc.) the configuration data (112) from the services registry (110), and utilizes the retrieved configuration data (112) for configuring the operation of the services gateway (104). As described above, such configuration may includes annotating one or more policies, and binding to such policies one or more routes.

For purposes of simplicity and clarity, the services gateway (104) is shown to include two services (128a and 128n), two policies (130a and 130n), and two routes (132a and 132n). However, it is contemplated that the services gateway (104) may include any number of services (128), policies (130), and/or routes (132) greater than or less than two. For example, the services gateway (104) may provide hundreds of services (120), while enforcing hundreds policies (130) via hundreds of routes (132).

As an option, there may be more than one or more instance of the services registry (110) on the services registry server (102). For example, a first instance of the services registry (110) may be configured for use by pre-production services gateways, and a second instance of the services registry (110) may be configured for use by production services gateways. In this manner, new policy annotations and data bindings may be tested on pre-production services gateways without interfering with the operation of production services gateways actively being used by customers and clients.

Figure 2A:
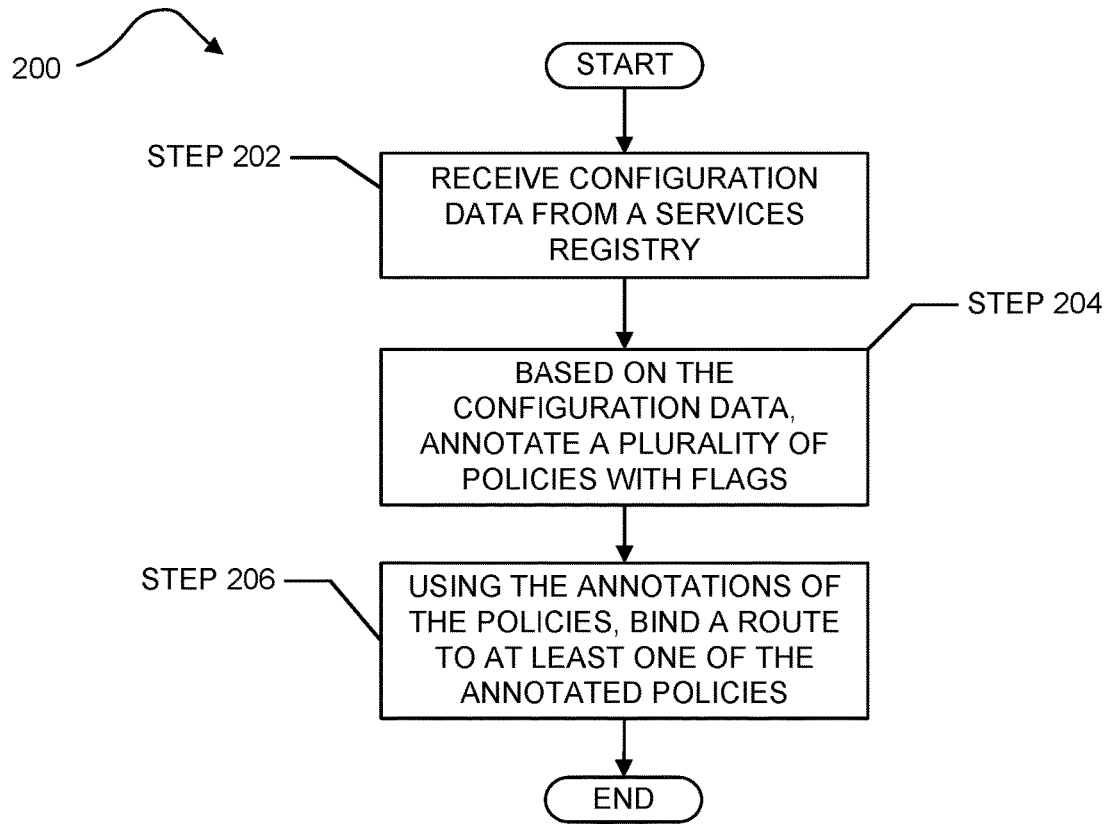
FIGS. 2A and 2B show flowcharts of methods for service gateway policy enforcement and service metadata binding, in accordance with one or more embodiments of the invention.
Figure 2B:
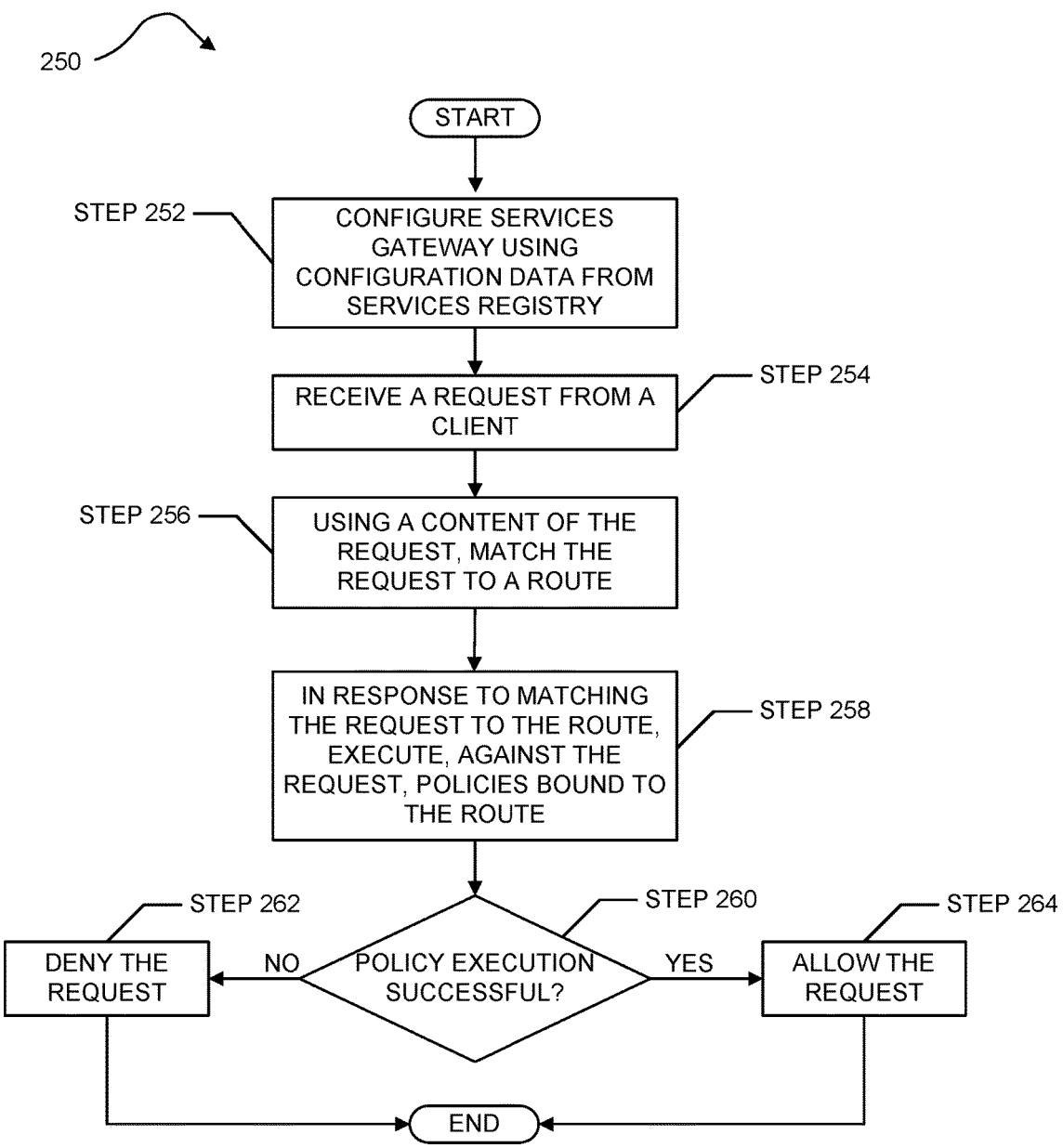

FIG. 2A depicts a flowchart of a method (200) for configuring a services gateway, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200) described in reference to FIG. 2A may be practiced using a services gateway (104) of the system (100) described in reference to FIGS. 1A-1B, above, and/or involving the computing system (400) described in reference to FIG. 4A.

As shown in FIG. 2A, at Step 202, configuration data is received from a services registry in accordance with one or more embodiments of the invention. In one or more embodiments, the configuration data may be received via a network. For example, the configuration data may be received via the Internet, a local area network (LAN), a wide area network (WAN), or a virtual private network (VPN). In one or more embodiments, the configuration data may include policy annotations and/or data bindings. As an option, the policy annotations include metadata describing one or more policies. The policies may include authentication protocols, throttling processes, authorization protocols, etc. As an option, the data bindings include metadata identifying a binding between a route and a policy.

In one or more embodiments, the configuration data may be received during an initialization process. For example, a services gateway (104) may retrieve the configuration data during a startup process, a restart, etc.

Based on the configuration data, a plurality of policies are annotated, at Step 204, with flags. In one or more embodiments, each of the flags may identify a portion of code as corresponding to a respective policy. For example, a first flag may identify a first portion of code as a first policy, and a second flag may identify a second portion of code as a second policy that is different than the first policy. In this way, different portions of code may be identified as corresponding to policies available for enforcement on the services gateway (104). Moreover, by flagging the policies in a manner that is consistent with a pre-determined set of policy annotations, the policies may be subsequently located in a more rapid manner. In one or more embodiments, annotating a policy with a flag may enable the linking of the policy to one or more other objects controlled on the services gateway (104).

Still yet, using the annotations of the policies, a route is bound, at Step 206, to at least one of the annotated policies. In one or more embodiments, the binding of a policy to a route includes an annotation of the policy with a set of metadata defining that the policy is executed for requests targeting the route. In other words, the binding of a route to a policy may statically link the route to the policy. As a result, whenever the route is identified in a client request, any policies bound to the route may be executed by a policy execution engine that follows such static links, as described in the context of FIG. 2B, below.

FIG. 2B depicts a flowchart of a method (250) for responding to client requests received at a services gateway, in accordance with one or more embodiments of the invention. In one or more embodiments, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method (250) described in reference to FIG. 2B may be practiced using the system (100) described in reference to FIGS. 1A-1B, above, and/or involving the computing system (400) described in reference to FIG. 4A.

Initially, Step 252, a services gateway is configured using configuration data from a services registry. As described above in the context of FIGS. 1A-1B, the services gateway may store policies. As an option, the services gateway may receive the policies from a server, such as, for example, a services registry server. The policies may be received and/or updated during an initialization process, at regularly scheduled intervals, or may be pushed to the services registry on-demand. The policies may include authentication protocols, throttling processes, authorization protocols, etc. The services gateway may be configured as described in the above discussion of Steps 202-206 of FIG. 2A. In other words, during the configuration of the services gateway, policies of the services gateway may be annotated, based on configuration data, with flags, as described above in the context of Step 204 of FIG. 2A. Moreover, the configuration of the services gateway may include binding one or more policies to one or more routes, as described above in the context of Step 206 of FIG. 2A.

At Step 254, a request is received from a client. Next, at Step 256, a content of the request is used to match the request to a route. In one or more embodiments, the request includes a message requesting access to a resource (i.e., service) via the services gateway. For example, the request may includes a PUT or GET request directed to a commerce service or financial management application. Moreover, the request may identify a path to the resource for which access is requested. In one or more embodiments, the content of the request is used to match the request to a route. As described above, the services gateway receiving the request may store numerous routes. The request may be matched to the route by performing a lookup on available routes, and comparing the paths of available routes with the path identified in the request.

In addition, in response to matching the request to the route, one or more policies that are bound to the route are executed against the request at Step 258. As used herein, executing a policy includes any process that enforces rules or requirements defined by the policy based on aspect of the request. As an option, the rules or requirements of the policy may be directed to a content of the request (e.g., an object targeted by the request), a timing of the request, a password contained in the request, etc. In addition, the rules or requirements of the policy may be directed to an origin of the request, such as, for example, a machine identifier, an IP address, a user name, an application, a geographic location, etc.

Next, it is determined, at Step 260, whether policy execution was successful. In one or more embodiments, an executed policy may return with a status that indicates whether execution of the policy failed or was successful. For example, where the policy is an authentication policy, if the client from which the request originated cannot be authenticated, then execution of the policy may fail. As another example, where the policy is an authorization policy, in order for the request to be allowed, the client from which the request originated must be authorized to perform the request.

In one or more embodiments, multiple policies may be bound to the route that matches the request received at Step 254. For example, a throttling policy, an authentication policy, and an authorization policy may all be bound to a single route that matches the request. As an option in such embodiments, in order for policy execution to be successful at Step 260, all of the policies may need to execute successfully. In other words, in such embodiments, for policy execution to be successful at Step 260, then all of the policies may need to return a success and/or none of the policies may return an error.

In embodiments where multiple policies are bound to the route that matches a request, an ordering of the policy execution may be determined by a predetermined phasing. For example, where three different policies are all bound to a single route that matches the request, then a pre-determined phasing may be used to determine the execution order of the three policies. More specifically, if a throttling policy, an authentication policy, and an authorization policy are all bound to a single route that matches the request, then, based on a pre-determined phasing, the authentication policy may execute first against the request, then the authorization policy may execute second against the request, and the throttling policy will execute last against the policy. In this manner, the order of execution of policies may be controlled.

In one or more embodiments, execution of a policy may be blocking or non-blocking. As an option, both blocking and non-blocking policies may be bound to a single route. In this manner, the policies bound to a targeted route may be executed in a synchronous and/or asynchronous manner.

If, at Step 260, it is determined that execution of the policies was successful, then the request is allowed at Step 264. In one or more embodiments, allowing the request includes granting access to a resource targeted by the request. For example, the request may originate from a client, where the request specifies a path to stored data or a service that the client intends to access. In such an example, if all policies identified based on the path in the request are successfully executed, then the client is given access to the stored data or service.

However, if, at Step 260, it is determined that execution of the policies was not successful, then the request is denied at Step 262. In one or more embodiments, denying the request includes any operations that results in a refusal of the request. For example, the request may originate from a client, where the request specifies a path to stored data or a service that the client intends to access. In such an example, if one or more of the policies identified based on the path in the request are not successfully executed, then the client is not provided access to the stored data or service in response to the request.

After the request is allowed or denied, at Step 264 or Step 262, respectively, the method (250) of FIG. 2B may end. In one or more embodiments, however, the services gateway may continue to perform the Steps 254-264 of the method (250) with respect to additional client requests. For example, the services gateway configured at Step 252 may receive additional requests, match the requests to routes, and allow or deny the requests based on whether the policies attached to the routes are executed successfully.

Figure 3:
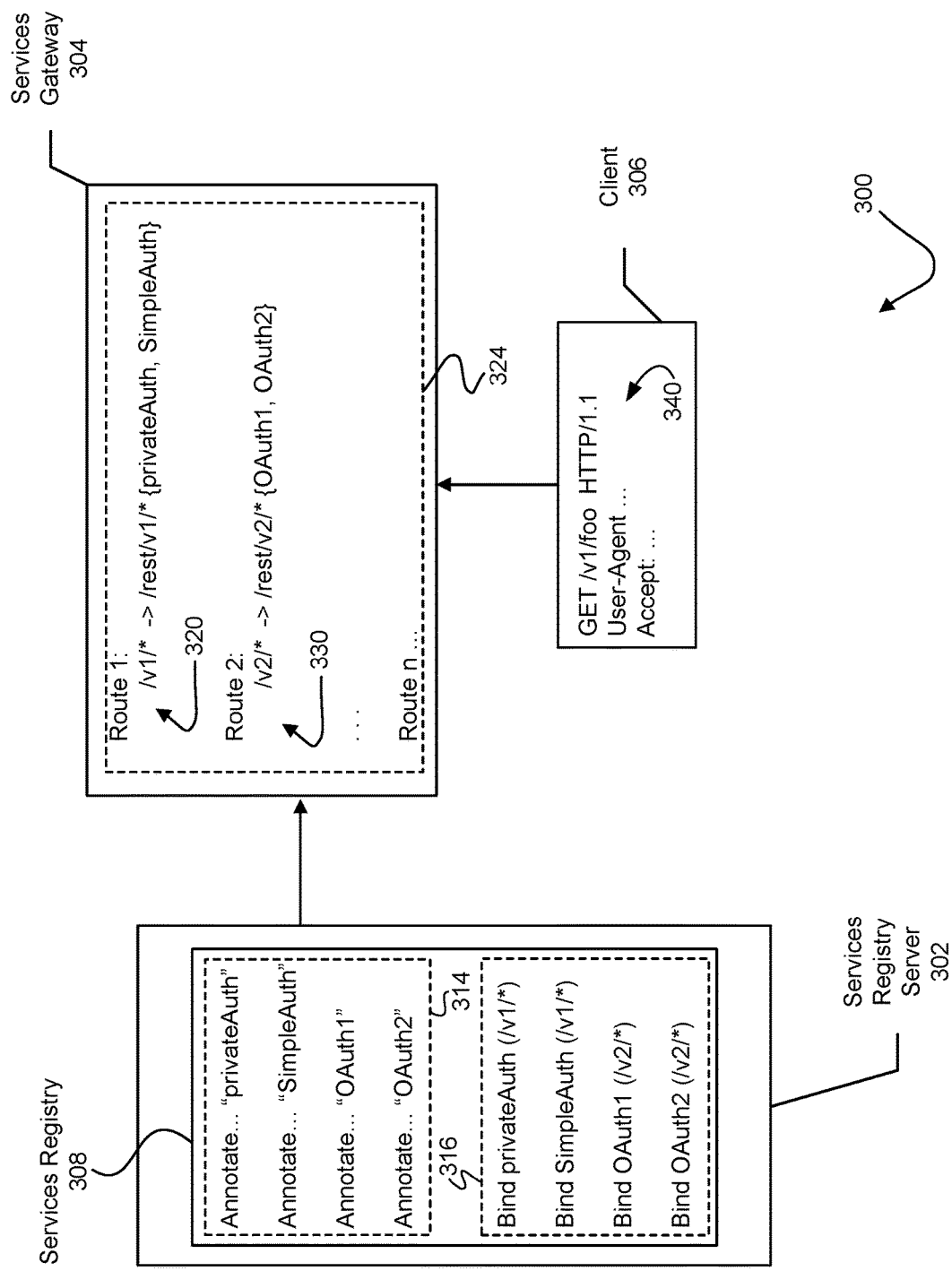
FIG. 3 shows an example of service gateway policy enforcement and service metadata binding, in accordance with one or more embodiments of the invention.

FIG. 3 illustrates a system (300) performing service gateway policy enforcement and service metadata binding, in accordance with one or more embodiments of the invention. The system (300) may perform the service gateway policy enforcement and service metadata binding in the context of the system (100) of FIGS. 1A-B, or the computing system (400) of FIG. 4A, and based on the methods described with respect to FIGS. 2A-2B, above.

As shown in FIG. 3, the system (300) includes a services registry server (302) in communication with a services gateway (304), as well as a client (306) in communication with the services gateway (304). The services registry server (302) may be substantially identical to the services registry server (102) previously described in the context of FIGS. 1A and 1B. Similarly, the services gateway (304) may be substantially identical to any of the services gateways (104) previously described in the context of FIGS. 1A and 1B. Also, the client (306) may be substantially identical to any of the clients (106) previously described in the context of FIGS. 1A and 1B.

As illustrated by FIG. 3, the services registry server (302) stores a services registry (308). Moreover, the services registry (308) is shown to include policy annotations (314) and data bindings (316). The policy annotations (314) of the services registry (308) provide instructions for flagging policies. More specifically, the policy annotations (314) provide instructions for annotating or flagging a first portion of code as including a "privateAuth" policy, a second portion of code as including a "SimpleAuth" policy, a third portion of code as including an "OAuth1" policy, and a fourth portion of code as including an "OAuth2" policy.

Also, the data bindings (316) of the services registry (308) include instructions to bind the policies identified in the policy annotations (314) to one or more routes. Specifically, the data bindings (316) provide instructions for binding the privateAuth policy to all v1 services (i.e., "/v1/*"), for binding the SimpleAuth policy to all v1 services (i.e., "/v1/*"), for binding the OAuth1 policy to all v2 services (i.e., "/v2/*"), and for binding the OAuth2 policy to all v2 services (i.e., "/v2/*"). In this manner, the services registry (308) may store instructions for validating portions of code as specifically including one or more pre-determined policies, as well as instructions for binding each of the pre-determined policies to paths used by clients to access services.

Furthermore, as illustrated by FIG. 3, the services gateway (304) receives configuration data from the services registry (308). More specifically, the services gateway receives the policy annotations (314) and the data bindings (316) from the services registry (308). In one or more embodiments, the services gateway (304) may retrieve configuration data from the services registry (308) during an initialization process of the services gateway (304). For example, the services gateway (304) may retrieve the policy annotations (314) and the data bindings (316) from the services registry (308) of the services registry server (302) during startup of the services gateway (304).

The services gateway (304) includes a routes pool (324). Specifically, the routes pool (324) is shown to include a first route (320) and a second route (330). The first route (320) is configured such that it is used by all v1 services on the services gateway 304. More specifically, the first route (320) is configured such that it is used for all v1 REpresentational State Transfer (REST) web services on the services gateway (304). In a similar manner, the second route (330) is configured such that it is used by all v2 services. More specifically, the second route (330) is configured such that it is used for all v2 REST web services on the services gateway (304).

Also, the services gateway 304 has been configured using the policy annotations (314) and the data bindings (316) received from the services registry (308). In particular, based on the policy annotations (314), privateAuth and SimpleAuth policies on the services gateway (304) have been flagged. Also, based on the data bindings (316), the flagged privateAuth and SimpleAuth policies have been bound to the first route (320) for the v1 REST web services. Similarly, based on the policy annotations (314), OAuth1 and OAuth2 policies on the services gateway (304) have been flagged. Also, based on the data bindings (316), the flagged OAuth1 and OAuth2 policies have been bound to the second route (330) for the v2 REST web services.

Although not shown in FIG. 3, additional other routes may be configured within the services gateway (304) based on the contents of the services registry (308). For example, other routes may include other combinations of policies that are not explicitly shown in FIG. 3.

Sometime after the services gateway (304) is configured, the services gateway (304) receives a request (340) from the client (306). As shown in FIG. 3, the request (340) includes (e.g., in a header of the request, etc.): "GET/v1/foo HTTP/1.1." Accordingly, the request (340) includes a Hypertext Transfer Protocol (HTTP) request to list, search, or acquire information from the foo service. The foo service may be accessible via the services gateway (304). Upon receiving the request (340) from the client (306), the services gateway (304) utilizes the path to the foo service in the request (340) to match the first route (320) with the with the request (340). More specifically, the "/v1/foo" contents of the request (340) are matched to the "/rest/v1/*" path of the first route (320). Accordingly, based on the matching of the first route (320) to the request (340), the policies bound to the first route (320) are executed against the request (340). Specifically, the privateAuth and SimpleAuth policies bound to the first route (320) are executed against the request (340). Executing the privateAuth and SimpleAuth policies against the request (340) may include any process that authenticates or authorizes access to the foo service by the client (306) or a user of the client (306). If both the privateAuth and SimpleAuth policies are successfully executed against the request (340), then the request (340) may be allowed to access the foo service. However, if one or both of the privateAuth and SimpleAuth policies are not successfully executed against the request (340), then the request (340) may be denied, and the client (306) will be unable to access the foo service based on the request (340).

Thus, the other policies (e.g., OAuth1 and OAuth2) are ignored during the processing of the request (340) from the client (306). In other words, because the OAuth1 and OAuth2 policies are not bound to the route (320) targeted by the request (340), the OAuth1 and OAuth2 policies are not entered and/or executed in response to receiving the request (340) from the client (306). In this manner, execution of any policies not bound to the route is prevented (i.e., execution of the OAuth1 and OAuth2 policies against the request is prevented). By ensuring that policies are not unnecessarily entered and/or executed, the runtime of processing requests may stay constant overtime. For example, as features and policies are added to the services gateway (304), the request processing time will stay constant as the additional features and policies will not impact the processing of the request (340) received from the client (306).

Conversely, in prior art systems, the enforcement time for policies may continually increase as new policies are created or added. For example, a prior art services gateway may be configured such that, for each received request, the prior art services gateway must enter and exit all policies on the prior art services gateway and perform a lookup to determine if each policy should be executed for the request. In other words, a prior art services gateway enforcing 30 policies can be expected enter, perform a corresponding lookup, and exit 50% more policies than a prior art services gateway that is responsible for enforcing only 20 of the policies. As a result, as the number of policies accumulate on the prior art services gateway, the runtime for every request can be expected to increase in a corresponding manner. The detrimental delays of such a system accumulate rapidly and significantly when requests are received by the hundreds, thousands, and beyond.

Accordingly, the gateway policy enforcement and service metadata binding systems and methods described hereinabove provide services gateways with a mechanism to quickly and efficiently respond to client requests. Moreover, as the number of services accessed via a services gateway increases and/or the number of policies enforced at the services gateway increases, response times of the services gateway will remain constant, and will not coordinately increase. This may allow web services developers to expand the number of services offered to clients without negatively impacting user experience.

Figure 4A:
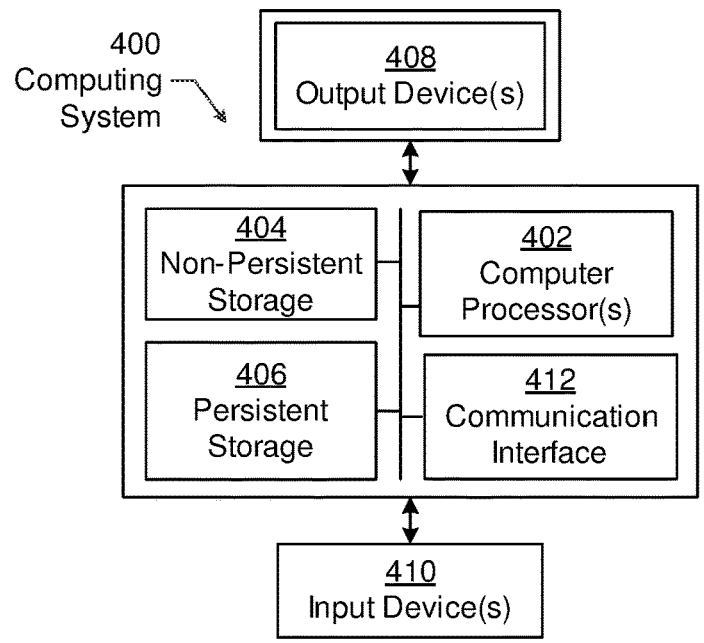
FIG. 4A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404)

(e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
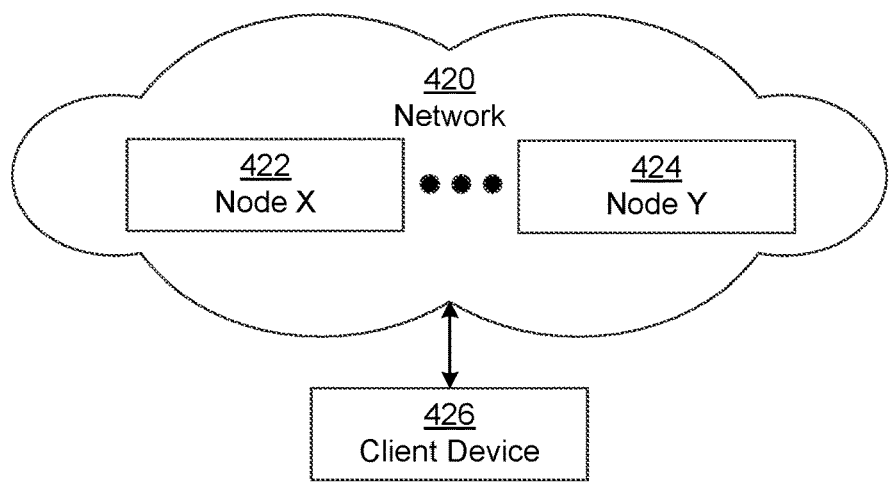
FIG. 4B shows a group of computing systems, in accordance with one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for gateway policy enforcement, comprising:
receiving configuration data from a services registry;
annotating, based on the configuration data, a plurality of policies with flags, wherein each of the flags identifies a portion of code to be mandatorily executed under a policy, based on the annotation of the policy with the flag; and binding, using the annotations of the policies, a route to at least one of the annotated policies.

2. The method of claim 1, further comprising:
receiving a request from a client; and
matching, using a content of the request, the request to the route.

3. The method of claim 2, further comprising:
in response to matching the request to the route, executing, against the request, the at least one of the policies bound to the route.

4. The method of claim 3, further comprising:
processing the request when the at least one of the policies is successfully executed against the request.

5. The method of claim 3, further comprising:
denying the request when the at least one of the policies is not successfully executed against the request.

6. The method of claim 3, wherein the configuration data is received from the services registry during an initialization process.

7. The method of claim 3, further comprising preventing execution, against the request, of any of the policies not bound to the route.

8. The method of claim 3, wherein the at least one of the policies bound to the route includes at least one of: an authentication type, an authorization rule, a throttling rule, and a traffic swimlane.

9. A system for gateway policy enforcement, comprising:
a hardware processor and memory; and
software instructions stored in the memory and configured to execute on the hardware processor, which, when executed by the hardware processor, cause the hardware processor to:
receive configuration data from a services registry;
annotate, based on the configuration data, a plurality of policies with flags, wherein each of the flags identifies a portion of code to be mandatorily executed under a policy, based on the annotation of the policy with the flag; and
bind, using the annotations of the policies, a route to at least one of the annotated policies.

10. The system of claim 9, wherein the software instructions are configured to, when executed by the hardware processor, further cause the hardware processor to:
receive a request from a client; and
match, using a content of the request, the request to the route.

11. The system of claim 10, wherein the software instructions are configured to, when executed by the hardware processor, further cause the hardware processor to:
in response to matching the request to the route, execute, against the request, the at least one of the policies bound to the route.

12. The system of claim 11, wherein the software instructions are configured to, when executed by the hardware processor, further cause the hardware processor to:
process the request when the at least one of the policies is successfully executed against the request.

13. The system of claim 11, wherein the software instructions are configured to, when executed by the hardware processor, further cause the hardware processor to:
deny the request when the at least one of the policies is not successfully executed against the request.

14. The system of claim 11, wherein the configuration data is received from the services registry during an initialization process.

15. The system of claim 11, wherein the software instructions are configured to, when executed by the hardware processor, further cause the hardware processor to:
prevent execution, against the request, of any of the policies not bound to the route.

16. The system of claim 11, wherein the at least one of the policies bound to the route includes at least one of: an authentication type, an authorization rule, a throttling rule, and a traffic swimlane.

17. A non-transitory computer readable medium for gateway policy enforcement comprising instructions that, when executed by a processor, perform a method, comprising:
receiving configuration data from a services registry;
annotating, based on the configuration data, a plurality of policies with flags, wherein each of the flags identifies a portion of code to be mandatorily executed under a policy, based on the annotation of the policy with the flag; and
binding, using the annotations of the policies, a route to at least one of the annotated policies.

18. The non-transitory computer readable medium of claim 17, wherein the instructions, when executed by the processor, further perform a method, comprising:
receiving a request from a client; and
matching, using a content of the request, the request to the route.

19. The non-transitory computer readable medium of claim 18, wherein the instructions, when executed by the processor, further perform a method, comprising:
in response to matching the request to the route, executing, against the request, the at least one of the policies bound to the route.

20. The non-transitory computer readable medium of claim 19, wherein the instructions, when executed by the processor, further perform a method, comprising:
processing the request when the at least one of the policies is successfully executed against the request.

* * * * *